United States Patent
Machishita et al.

(10) Patent No.: US 6,258,740 B1
(45) Date of Patent: Jul. 10, 2001

(54) ULTRAVIOLET RAY ABSORBING GLASS

(75) Inventors: Hiroshi Machishita; Kazutoshi Nakaya, both of Mie (JP)

(73) Assignee: Central Glass Company, Limited, Ube (JP)

(*) Notice: Subject to any disclaimer, the term of this patent is extended or adjusted under 35 U.S.C. 154(b) by 0 days.

(21) Appl. No.: 09/362,748

(22) Filed: Jul. 29, 1999

(30) Foreign Application Priority Data

Jul. 30, 1998 (JP) .................................................. 10-214699
Sep. 2, 1998 (JP) .................................................. 10-248383

(51) Int. Cl.$^7$ ........................... C03C 3/087; C03C 3/078; C03C 4/02; C03C 4/08
(52) U.S. Cl. .............................. 501/70; 501/69; 501/71; 501/72; 501/904; 501/905
(58) Field of Search .................................. 501/70, 69, 71, 501/904, 905, 72

(56) References Cited

U.S. PATENT DOCUMENTS

| | | |
|---|---|---|
| 5,061,659 | 10/1991 | Ciolek et al. . |
| 5,364,820 * | 11/1994 | Morimoto et al. ...................... 501/70 |
| 5,372,977 * | 12/1994 | Mazon-Ramos et al. .............. 501/70 |
| 5,747,398 * | 5/1998 | Higby et al. ............................ 501/70 |
| 5,763,342 * | 6/1998 | Mita et al. .............................. 501/70 |

FOREIGN PATENT DOCUMENTS

| | | |
|---|---|---|
| 592 237 | 4/1994 | (EP) . |
| 799 805 | 10/1997 | (EP) . |
| 811 581 | 12/1997 | (EP) . |
| 6-92678 | 4/1994 | (JP) . |
| 10-226534 | 8/1998 | (JP) . |

* cited by examiner

*Primary Examiner*—Michael Marcheschi
(74) *Attorney, Agent, or Firm*—Crowell & Moring, L.L.P.

(57) ABSTRACT

The invention relates to an ultraviolet ray absorbing soda-lime glass. This glass contains less than 0.10 wt % of iron in terms of $Fe_2O_3$, which is optionally contained as an impurity in the glass, 0.7–2.6 wt % of $CeO_2$, 0–1.3 wt % of $TiO_2$, 0–0.12 wt % of $V_2O_5$, 0.08–0.30 wt % of sulfur in terms of $SO_3$, and 0–0.0025 wt % of CoO. The glass at a thickness of 5 mm is not higher than 10% in ultraviolet radiation transmittance, is not lower than 80% in visible light transmittance, and is from 530 to 575 nm in dominant wavelength. The glass is transparent and clear, superior in ultraviolet ray absorption capability, and high in visible light transmittance.

5 Claims, No Drawings

ULTRAVIOLET RAY ABSORBING GLASS

BACKGROUND OF THE INVENTION

The present invention relates to an ultraviolet ray absorbing glass that is transparent and clear (i.e., colorless or almost colorless). The glass is suitable for use in various building, vehicle and transport plane windows, showcase window, glass substrate for display, etc. The glass can be tempered and bent by heating.

There is an increasing demand for glass that is clear and capable of absorbing ultraviolet rays, which may cause various articles, particularly those made of organic materials, to deteriorate or discolor and may cause adverse effects on human body. $Fe_2O_3$ is known as an ultraviolet ray absorbing component that is relatively cheap in price, and is light-absorptive within a wide range of the visible light region, thereby making a glass have a color.

Japanese Patent First Provisional Publication JP-A-6-92678 discloses an ultraviolet and infrared radiation absorbing glass comprising 0.1–0.8 wt % of Fe in terms of $Fe_2O_3$, 0.3–2 wt % of cerium oxide in terms of $CeO_2$, 0–1 wt % of $TiO_2$, 0–0.006 wt % of CoO, 0–0.0015 wt % of Se, and 0–0.01 wt % of NiO.

JP-A-10-226534 having a Japanese Patent Application No. 9-31830 discloses an ultraviolet ray absorbing soda-lime glass comprising 0.08–0.15 wt % of total iron in terms of $Fe_2O_3$, 1.3–1.7 wt % of $CeO_2$, 0.5–0.8 wt % of $TiO_2$ and 0.0005–0.0015 wt % of CoO, with a proviso that the weight ratio of ferrous iron to ferric iron, $Fe^{2+}/Fe^{3+}$, is not higher than 0.05. This glass is made to have at a thickness of 5 mm a visible light transmittance of not lower than 75% and an ultraviolet ray transmittance of not higher than 13%.

SUMMARY OF THE INVENTION

It is an object of the present invention to provide an ultraviolet ray absorbing soda-lime glass that is superior in ultraviolet ray absorption capability and high in visible light transmittance.

According to the present invention, there is provided an ultraviolet ray absorbing soda-lime glass. This glass comprises less than 0.10 wt % of iron, in terms of $Fe_2O_3$, which is optionally contained as an impurity in the glass, and 0.7–2.6 wt % of $CeO_2$, 0–1.3 wt % of $TiO_2$, 0–0.12 wt % of $V_2O_5$, 0.08–0.30 wt % of sulfur in terms of $SO_3$, and 0–0.0025 wt % of CoO. The glass at a thickness of 5 mm is not higher than 10% in ultraviolet radiation transmittance, is not lower than 80% in visible light transmittance, and is from 530 to 575 nm in dominant wavelength.

DESCRIPTION OF THE PREFERRED EMBODIMENTS

An ultraviolet ray absorbing soda-lime glass according to the present invention will be described in detail in the following.

Similar to conventional soda-lime float glasses, the glass may contain as a soda-lime glass fundamental components of $SiO_2$ in an amount of 67–75 wt %, $Al_2O_3$ of 0–3 wt %, CaO of 6–12 wt %, MgO of 2–6 wt %, $Na_2O$ of 10–15 wt %, and $K_2O$ of 0–3 wt %. Within these ranges of the fundamental components, the glass becomes superior in meltability, weatherability and durability and can easily and efficiently be produced using raw materials cheap in price.

As stated above, the glass comprises less than 0.10 wt % of iron, in terms of $Fe_2O_3$, which is optionally contained as an impurity in the glass. In other words, iron is not intentionally added to a batch of raw materials of the glass. Purified natural raw materials of the glass, however, such as silica sand, limestone and dolomite, may contain iron as an impurity, and therefore the glass may contain iron as an impurity in an amount that is at least 0.05 wt % and less than 0.10 wt %, in terms of $Fe_2O_3$. In fact, when the glass batch is melted, the proportions of $Fe^{2+}$ and $Fe^{3+}$ change reversibly depending on the oxidation-reduction condition of the glass melt to reach the equilibrium condition. $Fe^{3+}$ is absorptive in the ultraviolet region and also in a shorter wavelength side of the visible light region, thereby making the glass have a color. In contrast, $Fe^{2+}$ is absorptive in the near infrared region and also in longer wavelength side of the visible light region, thereby making the glass to have a color. Thus, the iron content of the glass must be less than 0.10 wt % in order to make the glass clear or substantially colorless.

The glass comprises 0.7–2.6 wt % of $CeO_2$. This $CeO_2$ serves as a major ultraviolet-ray-absorbing agent and is capable of absorbing ultraviolet rays in a so-called boundary region between the visible and ultraviolet regions. If it is less than 0.7 wt %, the glass becomes insufficient in ultraviolet absorption capability. If it exceeds 2.6 wt %, the glass becomes absorptive not only in the ultraviolet region but also in the visible light region exceeding its lower end (380 nm) in wavelength, thereby making the glass have a yellowish color.

The glass comprises 0–1.3 wt % of $TiO_2$. This $TiO_2$ is a material relatively cheap in price and has an ultraviolet absorbing capability similar to that of $CeO_2$. Thus, $TiO_2$ is optionally used as a supplement to $CeO_2$. If the $TiO_2$ content of the glass exceeds 1.3 wt %, the glass becomes also absorptive in the visible light region exceeding its lower end (380 nm) in wavelength, thereby making the glass have a yellowish color.

The glass comprises 0–0.12 wt % of $V_2O_5$. This $V_2O_5$ also has a great capability of absorbing ultraviolet rays and is optionally used as a supplement to $CeO_2$. $V_2O_5$ is absorptive at about 440 nm and about 630 nm in the visible region. Thus, if the $V_2O_5$ content of the glass exceeds 0.12 wt %, the glass is made to have a green color.

The glass comprises 0.08–0.30 wt % of sulfur in terms of $SO_3$. Sulfur may be added to the glass batch in the form of sulfate (e.g., $Na_2SO_4$), and serves as a refining agent and also as an oxidizing agent. Thus, sulfur is capable of stabilizing the ultraviolet absorption by $CeO_2$ and $TiO_2$. Furthermore, sulfur is capable of making the amount of $Fe^{3+}$ much larger than that of $Fe^{2+}$ in the glass batch. Therefore, it becomes possible to minimize the adverse effects of $Fe^{2+}$ on the glass. If the sulfur content of the glass is less than 0.08 wt %, the above-mentioned advantageous effects of sulfur become insufficient. If it is greater than 0.30 wt %, the glass melt tends to have bubbles therein. That is, the refining does not proceed properly, and thus it becomes difficult to produce a high-quality glass.

The glass comprises 0–0.0025 wt % of CoO. CoO has a plurality of absorption peaks in a range of 525–650 nm in the visible region. In fact, its absorption end on the shorter wavelength side is 450 nm and that on the longer wavelength side is 700 nm. The width therebetween is very broad, and CoO itself makes the glass have a bluish color. On the other hand, depending on the respective contents of $Fe_2O_3$ (FeO), $CeO_2$, $TiO_2$ and $V_{2O5}$, the spectral transmittance (transmittance-wavelength) curve of the glass is not necessarily flat. With this, the glass may have a pale color. In this case, CoO serves to eliminate this pale color to make the glass substantially colorless. Therefore, CoO is optionally added to the glass batch. If its content exceeds 0.0025 wt %, the bluish color of the glass becomes too strong.

It is preferable to add carbon to the glass batch in order to accelerate the decomposition of the above-mentioned sulfate. This carbon, however, serves as a reducing agent, and thus its amount should be minimized. In fact, its amount may be changed depending on the amount of the sulfate and is preferably not greater than about 0.2 parts by weight relative to 100 parts by weight of the glass batch.

The glass at a thickness of 5 mm is not higher than 10%, preferably not higher than 8%, in ultraviolet radiation transmittance. With this, it becomes possible to minimize adverse effects of ultraviolet rays on human body and substantially suppress the deterioration or discoloration of various articles made of organic materials (e.g., polymers). The ultraviolet radiation transmittance is the average transmittance in a range of 300–380 nm in wavelength, and its measurement is defined in ISO/DIS 13837 B.

The glass at a thickness of 5 mm is not lower than 80%, preferably not lower than 83%, in visible light transmittance. This value (not lower than 80%) is close to that of a transparent, clear glass. The visible light transmittance is the average transmittance in a range of 380–780 nm in wavelength, and its measurement is defined in Japanese Industrial Standard (JIS) R 3106.

The glass at a thickness of 5 mm is from 530 to 575 nm in dominant wavelength. This range is in a neutral region. With this, it becomes possible to suppress the deviation of the coloration, thereby producing a transparent, clear glass. The dominant wavelength is determined in accordance with JIS Z 8722.

According to a first preferred embodiment of the present invention, an ultraviolet ray absorbing soda-lime glass comprises 1.5–2.6 wt % of $CeO_2$, 0–1.1 wt % of $TiO_2$, 0–0.10 wt % of $V_2O_5$, 0.10–0.28 wt % of sulfur in terms of SO3, and 0–0.0020 wt % of CoO. This glass at a thickness of 5 mm is not higher than 10% in ultraviolet radiation transmittance, is not lower than 83% in visible light transmittance, and is from 535 to 575 nm in dominant wavelength. This glass may contain as an ultraviolet ray absorbing agent (1) a combination of $CeO_2$ and $TiO_2$ with the omission of $V_2O_5$, or (2) a combination of $CeO_2$ and $V_2O_5$ with the omission of $TiO_2$, or (3) $CeO_2$ with the omission of $TiO_2$ and $V_2O_5$.

According to a second preferred embodiment of the present invention, an ultraviolet ray absorbing soda-lime glass comprises 0.7–1.7 wt % of $CeO_2$, 0.2–1.2 wt % of $TiO_2$, 0.02–0.12 wt % of $V_2O_5$, 0.08–0.30 wt % of sulfur in terms of $SO_3$, and 0–0.0025 wt %, preferably 0.0006–0.0025wt %, of CoO. This glass at a thickness of 5 mm is not higher than 10% in ultraviolet radiation transmittance, is not lower than 83% in visible light transmittance, and is from 530 to 565 nm in dominant wavelength. As stated above, this glass contains as an ultraviolet ray absorbing agent a combination of $CeO_2$, $TiO_2$ and $V_2O_5$. With this, it becomes possible to reduce the amount of $CeO_2$, which is relatively high in price. This glass can be not higher than 3% in excitation purity, which is determined in accordance with JIS Z 8722. As to a colorless glass, an excitation purity of not higher than 5% suffices within a dominant wavelength range of 530–575 nm. This means that the light transmittance curve is almost flat in the entire visible region.

According to a third preferred embodiment of the present invention, an ultraviolet ray absorbing soda-lime glass comprises 1.4–2.6 wt % of $CeO_2$, 0–1.3 wt % of $TiO_2$, 0–0.12 wt % of $V_2O_5$, 0.13–0.28 wt % of sulfur in terms of $SO_3$, and 0–0.0025 wt % of CoO. This glass at a thickness of 5 mm is not higher than 10% in ultraviolet radiation transmittance, is not lower than 80% in visible light transmittance, and is from 535 to 575 nm in dominant wavelength.

A glass according to the invention can be formed into glass sheets of various thicknesses, for example, ranging from about 1 mm to about 10 mm, and according to need the glass sheets can be bent and/or tempered. Besides, a glass according to the invention can be used as a component of laminated glass or insulated glass.

The following nonlimitative examples are illustrative of the present invention.

EXAMPLES 1–22 & COMPARATIVE EXAMPLES 1–6

As raw materials of glass, silica sand, feldspar, soda ash, dolomite, limestone, mirabilite, cerium carbonate, titanium oxide, cobalt oxide, vanadium pentoxide, and carbon were used. In fact, the glass batch was adjusted in each of these examples and comparative examples to containing fundamental components of 71.9 wt % of $SiO_2$, 2.0 wt % of $Al_2O_3$, 3.7 wt % of MgO, 8.4 wt % of CaO, 13.0 wt % of $Na_2O$, and 1.0 wt % of $K_2O$, based on the total weight of these fundamental components. Furthermore, the glass batch was adjusted in each of these examples and comparative examples to having a chemical composition shown in Table. For example, as shown in Table, the addition of titanium oxide, cobalt oxide and vanadium pentoxide was omitted in Example 1.

In each of these examples and comparative examples, the raw materials of glass were weighed to have a total weight of 600 g and then mixed together. The obtained glass batch was introduced into a crucible and then melted in a box-type electric furnace at about 1480° C. for about 4 hr, thereby obtaining a refined glass melt. This glass melt was spread over a heat-resistant, inactive, carbon plate. The obtained glass plate was annealed and then subjected to an optical grinding to have a thickness of about 5 mm. This glass plate having widths of 100 mm was used as a test sample for the following chemical analysis of the glass composition and the following measurement of optical characteristics.

The chemical analysis of the glass composition was conducted by a wet method according to JIS R 3101. The results are shown in Table. The visible light transmittance (Tv) of the glass plate was determined in accordance with JIS R 3106 by the average transmittance of the spectral transmittance curve in a range of 380–780 nm, using illuminant D and a U-4000 type automated spectrophotometer of Hitachi Ltd. Similarly, the ultraviolet ray transmittance (Tuv) was determined in accordance with ISO/DIS 13837 method-B by the average transmittance in a range of 300–380 nm. Then, the dominant wavelength ($\lambda D$) and the excitation purity (Pe) were determined in accordance with JIS Z 8722. The results of the optical characteristics are also shown in Table.

TABLE

|  | Ex. 1 | Ex. 2 | Ex. 3 | Ex. 4 | Ex. 5 | Ex. 6 |
|---|---|---|---|---|---|---|
| Composition (wt %) | | | | | | |
| $Fe_2O_3$ (total iron) | 0.088 | 0.09 | 0.09 | 0.087 | 0.09 | 0.09 |
| $CeO_2$ | 2.3 | 2.55 | 2.5 | 1.6 | 1.7 | 2.0 |

TABLE-continued

|  |  |  |  |  |  |  |
|---|---|---|---|---|---|---|
| TiO$_2$ | — | — | — | 0.68 | 0.85 | 0.6 |
| V$_2$O$_5$ | — | — | — | — | — | — |
| CoO | — | — | 0.0014 | — | 0.0012 | 0.001 |
| SO$_3$ | 0.24 | 0.23 | 0.25 | 0.2 | 0.24 | 0.18 |
| Optical Characteristics |  |  |  |  |  |  |
| Tuv (%) | 9.5 | 8.4 | 8.7 | 9.2 | 7.7 | 7.2 |
| Tv (%) | 88.9 | 88.5 | 84.5 | 89.1 | 86.0 | 84.5 |
| λ D (nm) | 573 | 573 | 557 | 571 | 561 | 564 |
| Pe (%) | 3.0 | 3.8 | 0.6 | 2.5 | 1.8 | 2.5 |

|  | Ex. 7 | Ex. 8 | Ex. 9 | Ex. 10 | Ex. 11 | Ex. 12 |
|---|---|---|---|---|---|---|
| Composition (wt %) |  |  |  |  |  |  |
| Fe$_2$O$_3$ (total iron) | 0.088 | 0.09 | 0.087 | 0.087 | 0.078 | 0.065 |
| CeO$_2$ | 1.6 | 1.9 | 1.6 | 1.6 | 1.5 | 2.2 |
| TiO$_2$ | — | — | 0.7 | 0.35 | 1.1 | 0.6 |
| V$_2$O$_5$ | 0.08 | 0.085 | — | 0.06 | 0.03 | — |
| CoO | — | 0.0015 | 0.0017 | 0.001 | 0.0016 | 0.0016 |
| SO$_3$ | 0.2 | 0.16 | 0.22 | 0.18 | 0.15 | 0.16 |
| Optical Characteristics |  |  |  |  |  |  |
| Tuv (%) | 7.9 | 7.5 | 9.0 | 7.1 | 6.2 | 7.0 |
| Tv (%) | 88.0 | 83.5 | 84.1 | 85.7 | 84.0 | 84.5 |
| λ D (nm) | 566 | 560 | 537 | 563 | 560 | 560 |
| Pe (%) | 3.6 | 2.0 | 0.7 | 2.5 | 2.4 | 1.4 |

|  | Ex. 13 | Ex. 14 | Ex. 15 | Ex. 16 | Ex. 17 | Ex. 18 |
|---|---|---|---|---|---|---|
| Composition (wt %) |  |  |  |  |  |  |
| Fe$_2$O$_3$ (total iron) | 0.088 | 0.09 | 0.09 | 0.087 | 0.07 | 0.08 |
| CeO$_2$ | 1.59 | 1.61 | 1.69 | 1.50 | 0.75 | 0.95 |
| TiO$_2$ | 0.35 | 0.60 | 0.89 | 1.10 | 1.01 | 0.90 |
| V$_2$O$_5$ | 0.06 | 0.06 | 0.04 | 0.03 | 0.10 | 0.08 |
| CoO | 0.001 | 0.0016 | 0.0016 | 0.0016 | 0.001 | 0.0013 |
| SO$_3$ | 0.18 | 0.21 | 0.25 | 0.20 | 0.22 | 0.16 |
| Optical Characteristics |  |  |  |  |  |  |
| Tuv (%) | 8.6 | 7.7 | 6.3 | 7.1 | 7.5 | 7.8 |
| Tv (%) | 86.0 | 84.2 | 84.1 | 84.0 | 86.1 | 85.8 |
| λ D (nm) | 564 | 559 | 562 | 560 | 564 | 564 |
| Pe (%) | 2.6 | 2.1 | 2.7 | 2.5 | 2.9 | 2.7 |

|  | Ex. 19 | Ex. 20 | Ex. 21 | Ex. 22 |
|---|---|---|---|---|
| Composition (wt %) |  |  |  |  |
| Fe$_2$O$_3$ (total iron) | 0.088 | 0.09 | 0.07 | 0.08 |
| CeO$_2$ | 1.50 | 1.20 | 1.30 | 0.8 |
| TiO$_2$ | 1.11 | 0.90 | 0.60 | 0.95 |
| V$_2$O$_5$ | 0.03 | 0.05 | 0.08 | 0.11 |
| CoO | 0.0018 | 0.0015 | 0.0017 | 0.0016 |
| SO$_3$ | 0.20 | 0.16 | 0.22 | 0.18 |
| Optical Characteristics |  |  |  |  |
| Tuv (%) | 7.1 | 7.7 | 6.6 | 7.2 |
| Tv (%) | 83.2 | 84.9 | 83.9 | 84.3 |
| λ D (nm) | 557 | 561 | 557 | 557 |
| Pe (%) | 2.2 | 2.0 | 1.8 | 1.9 |

TABLE-continued

|  | Com. Ex. 1 | Com. Ex. 2 | Com. Ex. 3 | Com. Ex. 4 | Com. Ex. 5 | Com. Ex. 6 |
|---|---|---|---|---|---|---|
| Composition (wt %) |  |  |  |  |  |  |
| Fe$_2$O$_3$ (total iron) | 0.096 | 0.089 | 0.15 | 0.12 | 0.189 | 0.088 |
| CeO$_2$ | 1.053 | 1.5 | 1.6 | 0.8 | 0.75 | 1.0 |
| TiO$_2$ | — | — | 1.2 | 0.4 | 0.58 | — |
| V$_2$O$_5$ | — | — | — | — | — | 0.04 |
| CoO | — | — | 0.0025 | 0.001 | 0.003 | 0.0008 |
| SO$_3$ | 0.10 | 0.06 | 0.18 | 0.21 | 0.20 | 0.22 |
| Optical Characteristics |  |  |  |  |  |  |
| Tuv (%) | 25.4 | 18.9 | 4.8 | 22.0 | 29.6 | 19.0 |
| Tv (%) | 90.8 | 90.5 | 76.7 | 81.0 | 69.2 | 84.3 |
| λ D (nm) | 571 | 572 | 515 | 491 | 508 | 503 |
| Pe (%) | 1.2 | 1.7 | 0.9 | 1.9 | 0.5 | 0.6 |

The entire disclosure of Japanese Patent Application Nos. 10-214699 filed on Jul. 30, 1998 and 10-248383 filed on Sep. 2, 1998, of which priorities are claimed in the present application, including specification, claims, and summary, is incorporated herein by reference in its entirety.

What is claimed is:

1. An ultraviolet ray absorbing soda-lime glass, said glass comprising:

less than 0.10 wt % of iron in terms of Fe$_2$O$_3$, said iron being optionally contained as an impurity in said glass; and 0.7–1.7 wt % of CeO$_2$, 0.2–1.2 wt % of TiO$_2$, 0.02–0.12 wt % of V$_2$O$_5$, 0.08–0.30 wt % of sulphur in terms of SO$_3$, and 0–0.0025 wt % of CoO, wherein said glass at a thickness of 5 mm is not higher than 10% in ultraviolet radiation transmittance, is not lower than 83% in visible light transmittance, and is from 530 to 565 nm in dominant wavelength.

2. A glass according to claim 1, wherein said glass further comprises 67–75 wt % of SiO$_2$, 0–3 wt % of Al$_2$O$_3$, 6–12 wt % of CaO, 2–6 wt % of MgO, 10–15 wt % of Na$_2$O, and 0–3 wt % of K$_2$O.

3. A glass according to claim 1, wherein said glass further comprises carbon.

4. An ultraviolet ray absorbing soda lime glass, said glass consisting essentially of:

a first component that is 67–75 wt % of SiO$_2$, 0–3 wt % of Al$_2$O$_3$ 6–12 wt % of CaO, 2–6 wt % of MgO, 10–15 wt % of Na$_2$O, and 0–3 wt % of K$_2$O;

a second component that is less than 0.10 wt % of iron in terms of Fe$_2$O$_3$, said iron being optionally contained as an impurity in said glass;

a third component that is 0.7–1.7 wt % of CeO$_2$, 0.2–1.2 wt % of TiO$_2$, 0.02–0.12 wt % of V$_2$O$_5$, 0.08–0.30 wt % of sulphur in terms of SO$_3$, and 0–0.0025 wt % of CoO; and a fourth component that is carbon optionally contained in said glass, wherein said glass at a thickness of 5 mm is not higher than 10% in ultraviolet radiation transmittance, is not lower than 83% in visible light transmittance, and is from 530 to 565 nm in dominant wavelength.

5. A glass according to claim 4, wherein said fourth component is not greater than about 0.2 parts by weight relative to 100 parts by weight of a total of said first, second and third components.

* * * * *